United States Patent
Lopez

(12) 
(10) Patent No.: US 6,184,590 B1
(45) Date of Patent: Feb. 6, 2001

(54) WAVE-ACTUATED ELECTRICITY GENERATING DEVICE

(76) Inventor: Raymond Lopez, 2013 N. Sutter St., Stockton, CA (US) 95204

(*) Notice: Under 35 U.S.C. 154(b), the term of this patent shall be extended for 0 days.

(21) Appl. No.: 09/234,869

(22) Filed: Jan. 21, 1999

(51) Int. Cl.[7] ............... F03B 13/10; F03B 13/12
(52) U.S. Cl. ................ 290/53; 290/42; 290/43; 290/54
(58) Field of Search ................ 290/52, 53, 54, 290/55

(56) References Cited

U.S. PATENT DOCUMENTS

| | | | |
|---|---|---|---|
| 4,170,738 | * 10/1979 | Smith | 290/42 |
| 4,228,360 | * 10/1980 | Navarro | 290/43 |
| 4,281,257 | * 7/1981 | Testa et al. | 290/42 |
| 4,379,235 | * 4/1983 | Trepl, II | 290/53 |
| 4,931,662 | * 6/1990 | Burton | 290/42 |
| 5,084,630 | * 1/1992 | Azimi | 290/53 |
| 5,311,064 | * 5/1994 | Kumbatovic | 290/53 |
| 5,696,413 | * 12/1997 | Woodbridge et al. | 310/15 |
| 5,710,464 | * 1/1998 | Kao et al. | 290/53 |

* cited by examiner

Primary Examiner—Elvin Enad

(57) ABSTRACT

A wave-actuated electricity generating device for capturing the natural energy of waves of water for the production of electricity. The wave-actuated electricity generating device includes a base with upper and lower sides and front and back sides. A gate is adapted to move in response to waves exerting pressure against it. The gate has front and back surfaces, top and bottom ends, and a pair of lateral sides extending between the top and bottom ends. The bottom end of the gate is pivotally coupled to the base. The gate pivots in first and second directions with the movement of the waves. A pushrod has proximal and distal ends and a longitudinal axis extending therebetween. The proximal end of the pushrod is pivotally coupled to the gate. The distal end of the pushrod is adapted for coupling to an electrical power generator.

12 Claims, 2 Drawing Sheets

WAVE-ACTUATED ELECTRICITY GENERATING DEVICE

BACKGROUND OF THE INVENTION

1. Field of the Invention

The present invention relates to wave energy converters and more particularly pertains to a new wave-actuated electricity generating device for capturing the natural energy of waves of water for the production of electricity.

2. Description of the Prior Art

The use of wave energy converters is known in the prior art. More specifically, wave energy converters heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,291,234; U.S. Pat. No. 5,052,902; U.S. Pat. No. 4,625,124; U.S. Pat. No. 4,672,222; U.S. Pat. No. 3,696,251; and U.S. Pat. No. 4,568,836.

While these devices fulfill their respective, particular objectives and requirements, the aforementioned patents do not disclose a new wave-actuated electricity generating device. The inventive device includes a base with upper and lower sides and front and back sides. A gate is adapted to move in response to waves exerting pressure against it. The gate has front and back surfaces, top and bottom ends, and a pair of lateral sides extending between the top and bottom ends. The bottom end of the gate is pivotally coupled to the base. The gate pivots in first and second directions with the movement of the waves. A pushrod has proximal and distal ends and a longitudinal axis extending therebetween. The proximal end of the pushrod is pivotally coupled to the gate. The distal end of the pushrod is adapted for coupling to an electrical power generator.

In these respects, the wave-actuated electricity generating device according to the present invention substantially departs from the conventional concepts and designs of the prior art, and in so doing provides an apparatus primarily developed for the purpose of capturing the natural energy of waves of water for the production of electricity.

SUMMARY OF THE INVENTION

In view of the foregoing disadvantages inherent in the known types of wave energy converters now present in the prior art, the present invention provides a new wave-actuated electricity generating device construction wherein the same can be utilized for capturing the natural energy of waves of water for the production of electricity.

The general purpose of the present invention, which will be described subsequently in greater detail, is to provide a new wave-actuated electricity generating device apparatus and method which has many of the advantages of the wave energy converters mentioned heretofore and many novel features that result in a new wave-actuated electricity generating device which is not anticipated, rendered obvious, suggested, or even implied by any of the prior art wave energy converters, either alone or in any combination thereof.

To attain this, the present invention generally comprises a base with upper and lower sides and front and back sides. A gate is adapted to move in response to waves exerting pressure against it. The gate has front and back surfaces, top and bottom ends, and a pair of lateral sides extending between the top and bottom ends. The bottom end of the gate is pivotally coupled to the base. The gate pivots in first and second directions with the movement of the waves. A pushrod has proximal and distal ends and a longitudinal axis extending therebetween. The proximal end of the pushrod is pivotally coupled to the gate. The distal end of the pushrod is adapted for coupling to an electrical power generator.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new wave-actuated electricity generating device apparatus and method which has many of the advantages of the wave energy converters mentioned heretofore and many novel features that result in a new wave-actuated electricity generating device which is not anticipated, rendered obvious, suggested, or even implied by any of the prior art wave energy converters, either alone or in any combination thereof.

It is another object of the present invention to provide a new wave-actuated electricity generating device which may be easily and efficiently manufactured and marketed.

It is a further object of the present invention to provide a new wave-actuated electricity generating device which is of a durable and reliable construction.

An even further object of the present invention is to provide a new wave-actuated electricity generating device which is susceptible of a low cost of manufacture with regard to both materials and labor, and which accordingly is then susceptible of low prices of sale to the consuming public, thereby making such wave-actuated electricity generating device economically available to the buying public.

Still yet another object of the present invention is to provide a new wave-actuated electricity generating device which provides in the apparatuses and methods of the prior art some of the advantages thereof, while simultaneously overcoming some of the disadvantages normally associated therewith.

Still another object of the present invention is to provide a new wave-actuated electricity generating device for capturing the natural energy of waves of water for the production of electricity.

Yet another object of the present invention is to provide a new wave-actuated electricity generating device which includes a base with upper and lower sides and front and back sides. A gate is adapted to move in response to waves exerting pressure against it. The gate has front and back surfaces, top and bottom ends, and a pair of lateral sides extending between the top and bottom ends. The bottom end of the gate is pivotally coupled to the base. The gate pivots in first and second directions with the movement of the waves. A pushrod has proximal and distal ends and a longitudinal axis extending therebetween. The proximal end of the pushrod is pivotally coupled to the gate. The distal end of the pushrod is adapted for coupling to an electrical power generator.

Still yet another object of the present invention is to provide a new wave-actuated electricity generating device that produces energy cheaply because it does not need to be refueled.

Even still another object of the present invention is to provide a new wave-actuated electricity generating device that helps reduce pollution by providing a power source needing no fossil or nuclear fuels.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
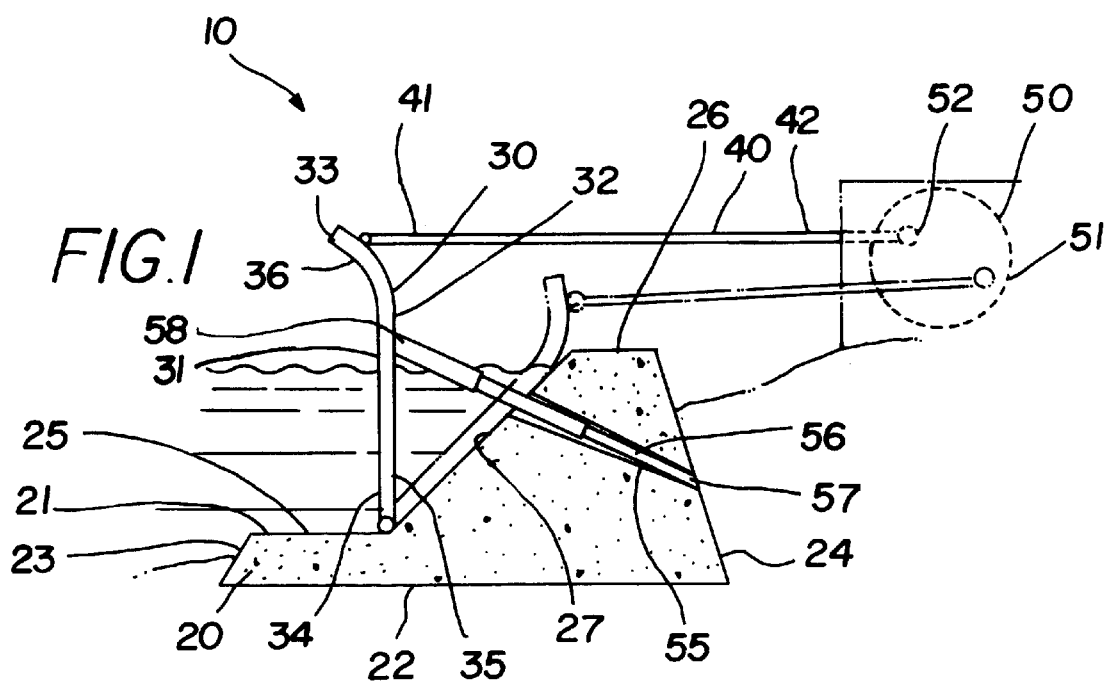
FIG. 1 is a schematic side view of a new wave-actuated electricity generating device according to the present invention.

With reference now to the drawings, and in particular to FIGS. 1 through 4 thereof, a new wave-actuated electricity generating device embodying the principles and concepts of the present invention and generally designated by the reference numeral 10 will be described.

As best illustrated in FIGS. 1 through 4, the wave-actuated electricity generating device 10 generally comprises a base 20 with upper and lower sides 21,22 and front and back sides 23,24. A gate is adapted to move in response to waves exerting pressure against it. The gate 30 has front and back surfaces 31,32, top and bottom ends 33,34, and a pair of lateral sides 35 extending between the top and bottom ends 33,34. The bottom end 34 of the gate 30 is pivotally coupled to the base 20. The gate 30 pivots in first and second directions with the movement of the waves. A pushrod 40 has proximal and distal ends 41,42 and a longitudinal axis extending therebetween. The proximal end 41 of the pushrod 40 is pivotally coupled to the gate 30. The distal end 42 of the pushrod 40 is adapted for coupling to an electrical power generator 50.

Preferably, the upper side 21 of the base 20 has a generally horizontal first portion 25 that is positioned towards the front side 23 of the base 20, a generally horizontal second portion 26 positioned towards the back side 24 of the base 20, and an angled portion 27 that extends between the first and second portions 25,26 of the upper side 21 of the base 20 such that an obtuse angle is formed between the first portion 25 of the upper side 21 of the base 20 and the angled portion 27. The angle is ideally about 135 degrees.

Figure 2:
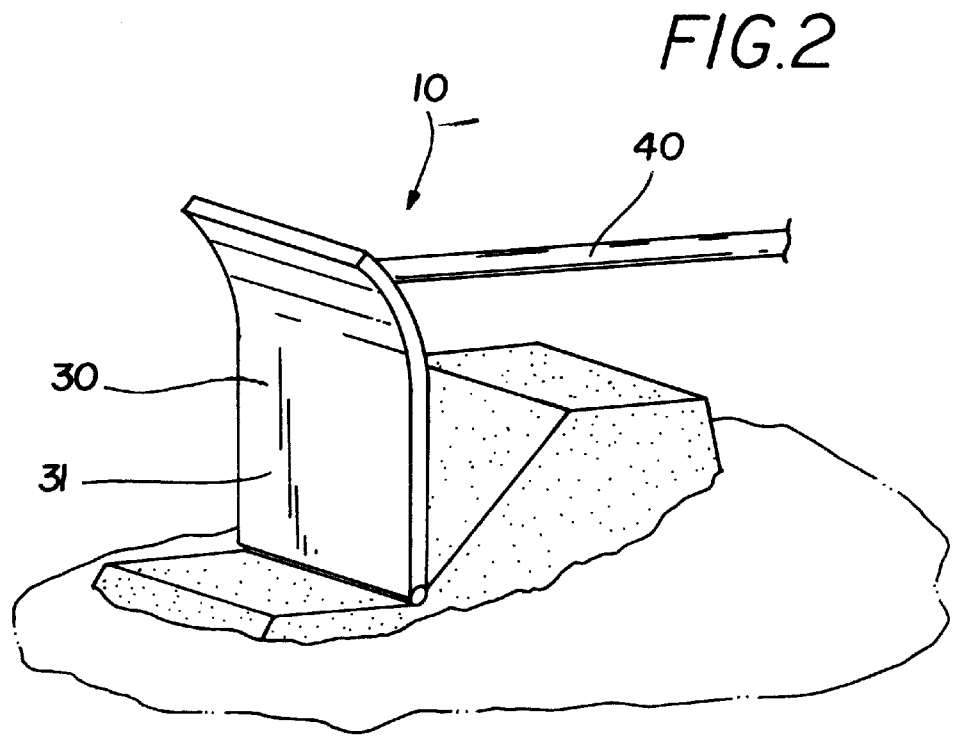
FIG. 2 is a schematic perspective view of the present invention.
Figure 3:
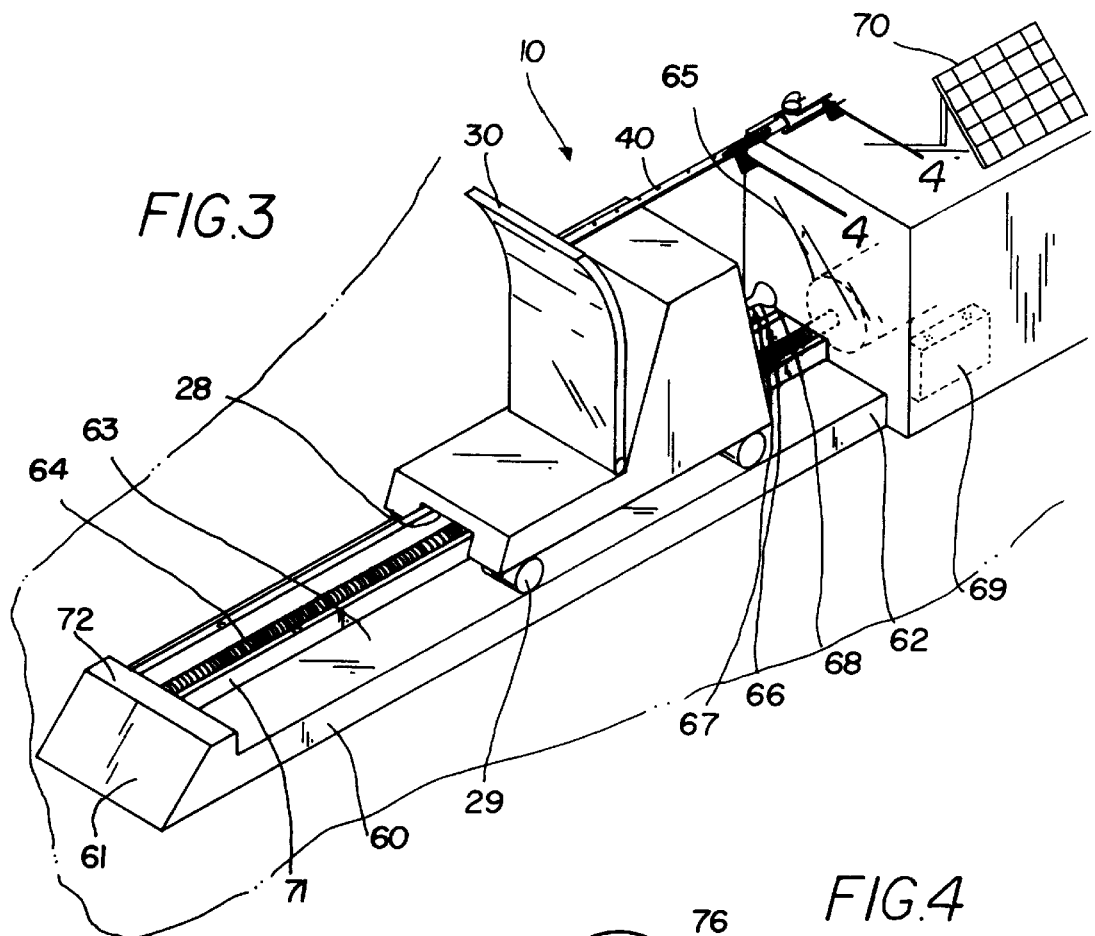
FIG. 3 is a schematic perspective view of the present invention.

Also preferably, the front and back sides 23,24 of the base 20 taper towards each other from the lower side 22 of the base 20 towards the upper side 21 of the base 20 to help keep the base 20 anchored in the ground if partially buried, as shown in FIG. 2. The tapering also pushes the portion of a wave striking the front side 23 of the base 20 upwardly towards the gate 30.

The gate 30 pivots in first and second directions. The first direction is towards the angled portion 27 of the base 20. The second direction is away from the angled portion 27 of the base 20. The angled portion 27 of the base 20 limits the movement of the gate 30 in the first direction by providing a surface against which the back surface 32 of the gate 30 abuts. Preferably, the gate 30 has a concave portion 36 positioned towards its top end 33 that curves towards its front surface 31 to reduce loss of wave energy cause by water splashing over the top end 33 of the gate 30 instead of pushing on it.

Preferably, an electrical power generator 50 operatively connected to the device 10. The electrical power generator 50 has a flywheel 51 operatively coupled to it. The electrical power generator 50 produces electricity when the flywheel 51 is rotated. The flywheel 51 has a mechanical linkage 52 coupled to it. The mechanical linkage 52 translates reciprocating motion into rotational motion for rotating the flywheel 51. The distal end 42 of the pushrod 40 is operatively coupled to the mechanical linkage 52. Thus, as the gate 30 moves back and forth in the first and second directions, the flywheel 51 is turned.

Also preferably, the base 20 has a frusto-conical bore 55 that extends through the angled portion 27 of the base 20 towards the back side 24 of the base 20. The bore 55 tapers together from the angled portion 27 of the base 20 towards the back side 24 of the base 20. A telescoping return arm 56 biases the gate 30 in the second direction. The return arm 56 has primary and secondary ends 57,58 and a longitudinal axis extending between its primary and secondary ends 57,58. The primary end 57 of the return arm 56 is disposed in the bore 55 of the base 20 and coupled to the inside of the bore 55 towards the back side 24 of the base 20. The secondary end 58 of the return arm 56 is pivotally coupled to the back surface 32 of the gate 30. In operation, the return arm 56 telescopically retracts as the gate 30 moves in the first direction. The return arm 56 telescopically extends as the gate 30 moves in the second direction. The return arm 56 is biased towards the second direction to return the gate 30 to a position where it will again be pushed in the first direction by a wave. A spring may be disposed in the return arm 56 to bias it towards an extended position.

A ramp 60 extends along a bottom of a body of water at an acute angle from a horizontal plane. The ramp 60 has front and back ends 61,62 and a top surface 63 that extends between the front and back ends 61,62. The base 20 is positionable along the ramp 60 between the front and back ends 61,62 of the ramp 60 to adjust the position of the gate 30 with respect to the height of the waves and/or the surface level of the water. Ideally, the front end 61 of the ramp 60 has an abutment lip 72 extending upwardly therefrom for limiting the movement of the base 20 towards the front end 61 of the ramp 60.

Preferably, the ramp 60 has a threaded shaft 64 that rotatably extends between the front and back ends 61,62 of the ramp 60 and is spaced apart from the top surface 63 of the ramp 60. Ideally, the threaded shaft 64 is coupled to a motor 65. Also ideally, a float switch 66 extends from the back side 24 of the base 20. The float switch 66 comprises a buoyant portion 68 coupled to an arm 67 that extends from a switch (not shown). If the arm 67 goes above a certain angle, the motor 65 turns the threaded shaft 64 to move the base 20 towards the back end 62. If the arm 67 goes below a certain angle, the motor 65 turns the threaded shaft 64 to move the base 20 towards the front end 61. In this way, the gate 30 is adjusted for maximum effectiveness, even with the varying water levels cause by the tides. Placement of the float switch 66 on the back side 24 of the base 20 is preferred because the surface of the water behind the base 20 is not as choppy, as the gate 30 and base 20 have broken the wave.

Also most ideally, the motor 65 is in communication with a battery 69 and a solar panel 70 by a wiring system. The solar panel 70 recharges the battery 69. The battery 69 may also be recharged by the electricity produced by the electrical power generator 50.

Also preferably, the lower side 22 of the base 20 has a channel 28 extending into it and that extends through the front and back sides 23,24 of the base 20. The channel 28 has a drive flange (not shown) extending downwardly from it. The drive flange has a threaded aperture through it. The threaded shaft 64 is threadedly inserted in the threaded aperture of the drive flange of the base 20 such that rotation of the threaded shaft 64 in one direction moves the base 20 along the ramp 60 towards the front end 61 of the ramp 60 and rotation of the threaded shaft 64 in another direction moving the base 20 along the ramp 60 towards the back end 62 of the ramp 60.

Figure 4:
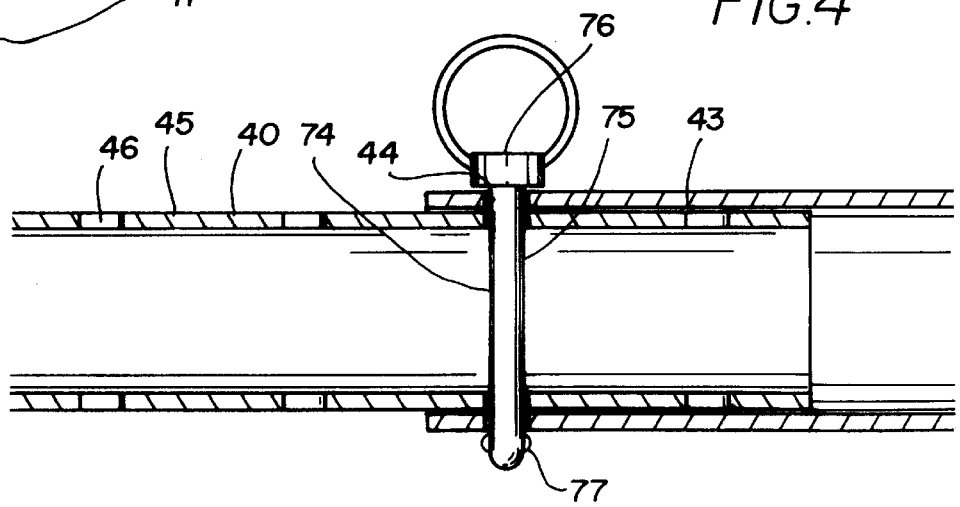
FIG. 4 is a schematic cross sectional view of the present invention taken from line 4—4 of FIG. 3.

Preferably, the pushrod 40 is telescopically extendible along the longitudinal axis thereof. As shown in FIG. 4, the pushrod 40 comprises an outer sleeve 43 and an inner sleeve 45 that is telescopically received in the outer sleeve 43. The outer sleeve 43 has a pair of opposed apertures 44 extending through it. The inner sleeve 45 has a plurality of sets of opposed holes 46 extending through it.

A pin 74 is insertable though the apertures 44 of the outer sleeve 43 and a set of holes 46 of the inner sleeve 45 aligned with the apertures 44 of the outer sleeve 43 to help prevent sliding of the inner sleeve 45 with respect to the outer sleeve 43. Ideally, the pin 74 has a head portion 76 and a shaft portion 75. The head portion 76 has an outer diameter greater than the shaft portion 75. The pin 74 has a pull ring extending from the head portion 76. A tip of the shaft portion 75 of the pin 74 has retractable bearing keepers 77 extending from it. The retractable bearing keepers 77 are biased outwardly of the pin 74 to abut the outer shaft so that the pin 74 does not become disengaged from the holes 46 and apertures 44 of the of the inner and outer sleeves 45,43.

Preferably, the lower side 22 of the base 20 has a plurality of wheels 29 coupled thereto that are positioned adjacent the channel 28. The wheels 29 rotatably engage the upper surface of the ramp 60 so that the base 20 moves more easily along the ramp 60 with less wear to the ramp 60.

Also preferably, the top surface 63 of the ramp 60 has a pair of spaced apart elongate 30 guide ridges 71 extending along it between the front and back ends 61,62 of the ramp 60. The guide ridges 71 are positioned on opposite sides of the threaded shaft 64. Ideally, each of the guide ridges 71 has a generally rectangular transverse cross section taken perpendicular to a longitudinal axis thereof. The guide ridges 71 of the ramp 60 slidably engage opposite walls of the channel 28 of the base 20.

In use, the base 20 is placed in a body of water with the gate 30 facing the incoming waves. As the waves hit the gate 30, the gate 30 is pushed in the first direction, thereby pushing on the pushrod 40 and turning the flywheel 51 of the generator 50 so that the generator 50 produces electricity. After a wave pushes the gate 30 back, the return arm 56 pushes the gate 30 in the second direction to put it in position for receiving another wave crash.

If the threaded shaft 64 is used, the position of the base 20 may be varied with respect to the height of the waves and/or the surface level of the water to maximize efficiency of the gate 30 in the surf.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A device for coupling to an electrical power generator for generating electrical power from waves of a body of water, said device comprising:

a base having upper and lower sides and front and back sides;

a gate adapted for moving in response to the waves exerting pressure thereagainst, said gate having front and back surfaces, top and bottom ends, and a pair of lateral sides extending between said top and bottom ends;

said bottom end of said gate being pivotally coupled to said base, said gate pivoting in first and second directions;

a pushrod having proximal and distal ends and a longitudinal axis extending therebetween, said proximal end of said pushrod being pivotally coupled to said gate, said distal end of said pushrod being adapted for coupling to the electrical power generator;

a ramp extending along a bottom of a body of water at an acute angle from a horizontal plane, said ramp having front and back ends and a top surface extending between said front and back ends, said base being positionable along said ramp between said front and back ends of said ramp;

wherein said ramp has a threaded shaft rotatably extending between said front and back ends of said ramp and spaced apart from said top surface of said ramp, said lower side of said base having a drive flange extending downwardly therefrom, said drive flange having a threaded aperture therethrough, said threaded shaft being threadedly inserted in said threaded aperture of said drive flange of said base, wherein rotation of said threaded shaft in one direction moves said base along said ramp towards said front end of said ramp, rotation of said threaded shaft in another direction moving said base along said ramp towards said back end of said ramp; and a float switch extending from said back side of said base, said float switch comprising a buoyant portion coupled to an arm being extended from a switch, said motor turning said threaded shaft to move said base towards said back end of said ramp when said arm goes above a predetermined angle, said motor turning said threaded shaft to move said base towards said front end of said ramp when said arm goes below a predetermined angle.

2. The device of claim 1, wherein said upper side of said base has a generally horizontal first portion being positioned towards said front side of said base, a generally horizontal second portion being positioned towards said back side of said base, and an angled portion extending between said first and second portions of said upper side of said base.

3. The device of claim 1, wherein said front and back sides of said base taper towards each other from said lower side of said base towards said upper side of said base.

4. The device of claim 1, wherein said gate has a concave portion positioned towards said top end thereof and curving towards said front surface thereof.

5. The device of claim 1, further comprising an electrical power generator having a flywheel operatively coupled thereto, said electrical power generator producing electricity when said flywheel is rotated, said flywheel having a mechanical linkage coupled thereto, said mechanical linkage being for translating reciprocating motion into rotational motion for rotating said flywheel, said distal end of said pushrod being operatively coupled to said mechanical linkage.

6. The device of claim 1, further comprising a telescoping return arm for biasing said gate away from a shoreline.

7. The device of claim 1, wherein said pushrod is telescopically extendible along said longitudinal axis thereof, said pushrod comprising an outer sleeve and an inner sleeve being telescopically received in said outer sleeve.

8. The device of claim 7, wherein said outer sleeve has a pair of opposed apertures extending therethrough, said inner sleeve having a plurality of sets of opposed holes extending therethrough, a pin being insertable though said apertures of said outer sleeve and a set of holes of said inner sleeve aligned with said apertures of said outer sleeve for helping prevent sliding of said inner sleeve with respect to said outer sleeve.

9. The device of claim 1, wherein said lower side of said base has a plurality of wheels coupled thereto, said wheels being for rotatably engaging said upper surface of said ramp.

10. The device of claim 1, wherein said lower side of said base has a channel extending therein and extending through said front and back sides of said base, said top surface of said ramp having a pair of spaced apart elongate guide ridges extending therealong between said front and back ends of said ramp and positioned on opposite sides of said threaded shaft, each of said guide ridges having a generally rectangular transverse cross section taken perpendicular to a longitudinal axis thereof, said guide ridges of said ramp slidably engaging opposite walls of said channel of said base.

11. A system for generating electrical power from waves of a body of water, said system comprising, in combination:

a base having upper and lower sides and front and back sides, said upper side of said base having a generally horizontal first portion being positioned towards said front side of said base, a generally horizontal second portion being positioned towards said back side of said base, and an angled portion extending between said first and second portions of said upper side of said base;

said front and back sides of said base tapering towards each other from said lower side of said base towards said upper side of said base;

a gate adapted for moving in response to the waves exerting pressure thereagainst, said gate having front and back surfaces, top and bottom ends, and a pair of lateral sides extending between said top and bottom ends;

said bottom end of said gate being pivotally coupled to said base, said gate pivoting in first and second directions, said first direction being towards said angled portion of said base, said second direction being away from said angled portion of said base;

said gate having a concave portion positioned towards said top end thereof and curving towards said front surface thereof;

a pushrod having proximal and distal ends and a longitudinal axis extending therebetween, said proximal end of said pushrod being pivotally coupled to said top end of said gate;

an electrical power generator having a flywheel operatively coupled thereto, said electrical power generator producing electricity when said flywheel is rotated;

said flywheel having a mechanical linkage coupled thereto, said mechanical linkage being for translating reciprocating motion into rotational motion for rotating said flywheel, said distal end of said pushrod being operatively coupled to said mechanical linkage;

said base having a frusto-conical bore extending through said angled portion of said base towards said back side of said base, said bore tapering together from said angled portion of said base towards said back side of said base;

a telescoping return arm for biasing said gate in said second direction, said return arm having primary and secondary ends and a longitudinal axis extending between said primary and secondary ends thereof, said primary end of said return arm being disposed in said bore of said base and coupled thereto towards said back side of said base, said secondary end of said return arm being pivotally coupled to said back surface of said gate;

said return arm telescopically retracting as said gate moves in said first direction, said return arm telescopically extending as said gate moves in said second direction, said return arm being biased towards said second direction;

a ramp extending along a bottom of a body of water at an acute angle from a horizontal plane, said ramp having front and back ends and a top surface extending between said front and back ends, said base being positionable along said ramp between said front and back ends of said ramp;

said ramp having a threaded shaft rotatably extending between said front and back ends and spaced apart from said top surface, said threaded shaft being coupled to a motor;

said lower side of said base having a channel extending therein and extending through said front and back sides of said base, said channel having a drive flange extending downwardly therefrom, said drive flange having a threaded aperture therethrough, said threaded shaft being threadedly inserted in said threaded aperture of said drive flange of said base;

wherein rotation of said threaded shaft in one direction moves said base along said ramp towards said front end of said ramp, rotation of said threaded shaft in another direction moving said base along said ramp towards said back end of said ramp;

a float switch extending from said back side of said base, said float switch comprising a buoyant portion coupled to an arm being extended from a switch, said motor turning said threaded shaft to move said base towards said back end of said ramp when said arm goes above a predetermined angle, said motor turning said threaded shaft to move said base towards said front end of said ramp when said arm goes below a predetermined angle;

said motor being in communication with a battery and a solar panel, said solar panel recharging said battery;

said pushrod being telescopically extendible along said longitudinal axis thereof, said pushrod comprising an outer sleeve and an inner sleeve being telescopically received in said outer sleeve;

said outer sleeve having a pair of opposed apertures extending therethrough, said inner sleeve having a plurality of sets of opposed holes extending therethrough;

a pin being insertable though said apertures of said outer sleeve and a set of holes of said inner sleeve aligned with said apertures of said outer sleeve for helping prevent sliding of said inner sleeve with respect to said outer sleeve;

said lower side of said base having a plurality of wheels coupled thereto and being positioned adjacent said channel, said wheels being for rotatably engaging said upper surface of said ramp;

said top surface of said ramp having a pair of spaced apart elongate guide ridges extending therealong between said front and back ends of said ramp and positioned on opposite sides of said threaded shaft, each of said guide ridges having a generally rectangular transverse cross section taken perpendicular to a longitudinal axis thereof;

said guide ridges of said ramp slidably engaging opposite walls of said channel of said base; and said front end of said ramp having an abutment lip extending upwardly therefrom.

12. A device for coupling to an electrical power generator for generating electrical power from waves of a body of water, said device comprising:

a base having upper and lower sides and front and back sides;

a gate for moving in response to the waves exerting pressure thereagainst, said gate having front and back surfaces, top and bottom ends, and a pair of lateral sides extending between said top and bottom ends;

said bottom end of said gate being pivotally coupled to said base, said gate pivoting in first and second directions;

a pushrod having proximal and distal ends and a longitudinal axis extending therebetween, said proximal end of said pushrod being pivotally coupled to said gate;

an electrical power generator having a flywheel operatively coupled thereto, said electrical power generator producing electricity when said flywheel is rotated, said flywheel having a mechanical linkage coupled thereto, said mechanical linkage being for translating reciprocating motion into rotational motion for rotating said flywheel, said distal end of said pushrod being operatively coupled to said mechanical linkage; and a telescoping return arm for biasing said gate away from a shoreline; said return arm having primary and secondary ends and a longitudinal axis extending between said primary and secondary ends thereof, said primary end of said return arm being disposed in a bore in said base and coupled thereto towards said back side of said base, said secondary end of said return arm being pivotally coupled to said back surface of said gate, said return arm telescopically retracting as said gate moves in said first direction, said return arm telescopically extending as said gate moves in said second direction, said return arm being biased towards said second direction.

* * * * *